United States Patent
Ota et al.

(10) Patent No.: US 10,266,729 B2
(45) Date of Patent: Apr. 23, 2019

(54) THERMOCURABLE ELECTROCONDUCTIVE ADHESIVE

(71) Applicant: THREE BOND CO., LTD., Hachioji-shi, Tokyo (JP)

(72) Inventors: Soichi Ota, Hachioji (JP); Hitoshi Mafune, Hachioji (JP); Makoto Kato, Hachioji (JP); Masayuki Osada, Hachioji (JP); Takashi Suzuki, Hachioji (JP)

(73) Assignee: THREE BOND CO., LTD., Hachioji-Shi, Tokyo (JP)

( * ) Notice: Subject to any disclaimer, the term of this patent is extended or adjusted under 35 U.S.C. 154(b) by 0 days.

(21) Appl. No.: 15/554,278

(22) PCT Filed: Feb. 29, 2016

(86) PCT No.: PCT/JP2016/056135
§ 371 (c)(1),
(2) Date: Aug. 29, 2017

(87) PCT Pub. No.: WO2016/140204
PCT Pub. Date: Sep. 9, 2016

(65) Prior Publication Data
US 2018/0079935 A1 Mar. 22, 2018

(30) Foreign Application Priority Data
Mar. 2, 2015 (JP) ................. 2015-040513

(51) Int. Cl.
| | |
|---|---|
| *C09J 9/02* | (2006.01) |
| *C09J 11/06* | (2006.01) |
| *C09J 4/02* | (2006.01) |
| *C09J 9/00* | (2006.01) |
| *C09J 171/00* | (2006.01) |
| *H01B 1/22* | (2006.01) |
| *C09J 4/00* | (2006.01) |
| *C08F 290/06* | (2006.01) |
| *C08K 3/08* | (2006.01) |

(52) U.S. Cl.
CPC ............ *C09J 9/02* (2013.01); *C08F 290/067* (2013.01); *C09J 4/00* (2013.01); *C09J 9/00* (2013.01); *C09J 11/06* (2013.01); *C09J 171/00* (2013.01); *H01B 1/22* (2013.01); *C08K 2003/0806* (2013.01); *C08K 2003/0856* (2013.01)

(58) Field of Classification Search
None
See application file for complete search history.

(56) References Cited

U.S. PATENT DOCUMENTS

| | | |
|---|---|---|
| 5,929,141 A | 7/1999 | Lau et al. |
| 2009/0309220 A1 | 12/2009 | Katogi et al. |
| 2010/0327232 A1 | 12/2010 | Yamamoto et al. |
| 2012/0273974 A1 | 11/2012 | Katogi et al. |

FOREIGN PATENT DOCUMENTS

| | | |
|---|---|---|
| JP | A-H10-095966 | 4/1998 |
| JP | A-2003-313533 | 11/2003 |
| JP | A-2004-269689 | 9/2004 |
| JP | A-2006-257200 | 9/2006 |
| JP | A-2009-277769 | 11/2009 |
| JP | A-2013-028675 | 2/2013 |
| WO | WO 2008/062548 A1 | 5/2008 |
| WO | WO 2010/047200 A1 | 4/2010 |

OTHER PUBLICATIONS

International Search Report and Written Opinion dated Jun. 14, 2016 which issued in PCT Application No. PCT/JP2016/056135.

*Primary Examiner* — Katie L. Hammer
(74) *Attorney, Agent, or Firm* — Dickinson Wright PLLC

(57) ABSTRACT

Conventional electroconductive adhesives had difficulty to have simultaneously storage stability and low temperature curability, and to have at the same time exhibition of adhesion strength and electric conductivity for poorly-adhesive metal adherends such as gold and nickel. The present invention accordingly provides an isotropic electroconductive adhesive that has low temperature curability in an atmosphere of 80 to 130° C. A thermocurable electroconductive adhesive containing component (A) to component (E) such that the component (E) is contained at 100 parts by mass or more and 1000 parts by mass or less relative to 100 parts by mass of the total of the component (A) and component (B); component (A): a urethane modified oligomer having a (meth)acrylic group component (B): a monomer having one (meth)acrylic group in the molecule component (C): an organic peroxide having specific structure component (D): a phosphoric acid ester compound component (E): electroconductive particles that are surface-treated with stearic acid.

9 Claims, No Drawings

THERMOCURABLE ELECTROCONDUCTIVE ADHESIVE

TECHNICAL FIELD

The present invention relates to an isotropic electroconductive adhesive having thermocurability.

BACKGROUND ART

In JP 2003-313533 A, an invention relating to an anisotropic electroconductive adhesive containing a urethane acrylate resin and organic peroxides is described. In the anisotropic electroconductive adhesive according to the corresponding invention, in addition to a phenoxy resin, an acrylic resin elastomer is contained as an essential component, and they are added so as to be used as a film forming agent for forming them into a film shape and to exhibit a toughness property of the film. A phosphoric acid ester compound with specific structure is also added to exhibit the effect as a coupling agent. Furthermore, the anisotropic electroconductive adhesive according to the corresponding invention has a constitution in which the adhesive is obtained by having electroconductive particles dispersed in the adhesive resin composition.

Furthermore, from the viewpoint that the aforementioned invention relates to an anisotropic electroconductive adhesive, a constitution of having an absolutely small addition amount of electroconductive particles is postulated, and such constitution is different from so-called silver paste added with a large amount of electroconductive particles (isotropic electroconductive adhesive) significantly in terms of the addition amount of electroconductive particles. Herein, it is known that, as the addition amount of electroconductive particles increases in a electroconductive adhesive, the addition amount of resin components decreases to yield a tendency of having faster speed at which viscosity of adhesive increases due to significant reflection of a change in viscosity of the resin components. It is also known that, although the apparent speed at which viscosity increases may be suppressed by using a solvent, use of a solvent tends to cause a decrease in adhesive strength or poor outer appearance due to foaming in a cured product as caused by solvent volatilization during curing.

SUMMARY OF INVENTION

As described above, according to the electroconductive adhesive of a related art, the storage stability and low temperature curability are in a trade-off relationship and, if the low temperature curability is increased, there is a tendency of having faster speed at which viscosity increases due to a decrease in the storage stability. Furthermore, if a solvent is used, air bubbles remain on an interface between an adherend and an adhesive, and, as a result, there is a tendency that the adhesion strength is lowered, and at the same time the higher connection resistance on the interface is caused in conjunction with a decrease in adhesion area. Accordingly, it was shown to be difficult to have simultaneously the storage stability in an atmosphere of 25° C. and the low temperature curability for having curing in an atmosphere of 80 to 130° C., and to have at the same time the exhibition of adhesion strength and electric conductivity for a poorly-adhesive metal adherend such as gold or nickel.

The inventors of the present invention conducted intensive studies to achieve the object described above, and, as a result, found means relating to an isotropic electroconductive adhesive having thermocurability that can solve the above problems. The present invention was completed, accordingly.

The gist of the present invention is described hereinbelow. The present invention relates to a thermocurable electroconductive adhesive containing component (A) to component (E) such that the component (E) is contained at 100 parts by mass or more and 1000 parts by mass or less relative to 100 parts by mass of the total of the component (A) and component (B);

component (A): a urethane modified oligomer having a (meth)acrylic group component (B): a monomer having one (meth)acrylic group in the molecule component (C): an organic peroxide having a structure of the general formula 1 which will be described later component (D): a phosphoric acid ester compound component (E): electroconductive particles that are surface-treated with stearic acid

DESCRIPTION OF EMBODIMENTS

The first embodiment of the present invention relates to a thermocurable electroconductive adhesive containing component (A) to component (E) such that the component (E) is contained at 100 parts by mass or more and 1000 parts by mass or less relative to 100 parts by mass of the total of the component (A) and component (B);

component (A): a urethane modified oligomer having a (meth)acrylic group component (B): a monomer having one (meth)acrylic group in the molecule component (C): an organic peroxide having a structure of the general formula 1 which will be described later component (D): a phosphoric acid ester compound component (E): electroconductive particles that are surface-treated with stearic acid The second embodiment of the present invention is the thermocurable electroconductive adhesive according to the first embodiment, wherein the component (C) is an organic peroxide having the general formula 2 which will be described later.

The third embodiment of the present invention is the thermocurable electroconductive adhesive according to the first or second embodiment, wherein the component (E) is at least one kind selected from silver powder and silver-plated powder that are surface-treated with stearic acid.

The fourth embodiment of the present invention is the thermocurable electroconductive adhesive according to any one of the first to third embodiments, wherein the component (D) contains a phosphoric acid ester compound which has a (meth)acrylic group in the molecule.

The fifth embodiment of the present invention is the thermocurable electroconductive adhesive according to any one of the first to fourth embodiments, further including a phenoxy resin.

The sixth embodiment of the present invention is the thermocurable electroconductive adhesive according to any one of the first to fifth embodiments, further including a ferromagnetic powder.

The seventh embodiment of the present invention is the thermocurable electroconductive adhesive according to any one of the first to sixth embodiments, wherein the adhesive is used for adhesion to a gold and/or nickel adherend.

The eighth embodiment of the present invention is the thermocurable electroconductive adhesive according to the seventh embodiment, wherein adhesion strength to a gold and/or nickel adherend is 5 MPa or higher.

With the thermocurable electroconductive adhesive according to one embodiment of the present inventions it is possible to have simultaneously the storage stability in an atmosphere of 25° C. and the low temperature curability for having curing in an atmosphere of 80 to 130° C., and also to have exhibition of adhesion strength and electric conductivity for a poorly-adhesive metal adherend such as gold or nickel.

In the present specification, "X to Y" representing a range means "X or more and Y or less." Furthermore, in the present specification, a "(meth)acrylic group" represents a "(meth)acryloyl group", "(meth)acryloyl" means "acryloyl or methacryloyl", "(meth)acrylic acid" means "acrylic acid or methacrylic acid", and "(meth)acrylate" indicates "acrylate or methacrylate".

<Thermocurable Electroconductive Adhesive>

Hereinbelow, the thermocurable electroconductive adhesive according to one aspect of the present invention is described in detail.

<<Component (A): Urethane Modified Oligomer Having (Meth)Acrylic Group>>

The present invention are described in detail hereinbelow. The component (A) which may be used in the present invention is a urethane modified oligomer having a (meth) acrylic group.

Furthermore, the component (B) preferably has the (meth) acrylic group in the form of a (meth)acyloyloxy group, and more preferably in the form of an acyloyloxy group.

As for the method for synthesizing the component (A), a synthetic method by which a urethane bond is formed with polyol and polyisocyanate and a compound having a hydroxyl group and a (meth)acrylic group or an acrylic acid is added to an unreacted isocyanate group is known.

As for the component (A), a commercially available product may be used, and specific examples thereof include AH-600, AT-600, UA-306H, and UF-8001G that are manufactured by Kyoeisha Chemical Co., Ltd., but it is not limited thereto.

<<Component (B): Monomer Having One (Meth)Acrylic Group in the Molecule>>

The component (B) which can be used in the present invention is a monomer having one (meth)acrylic group in the molecule. Furthermore, in the present invention, it is possible to further add, as other components described below, a monomer which has two or more (meth)acrylic groups in the molecule within a range in which the characteristics of the present invention are not impaired by it. However, considering the exhibition of electric conductivity, it is preferable not to add a monomer which has two or more (meth)acrylic groups in the molecule.

Furthermore, the component (B) preferably has the (meth) acrylic group in the form of a (meth)acyloyloxy group, and more preferably in the form of an acyloyloxy group.

Specific examples of the component (B) include (meth) acrylic acid, lauryl (meth)acrylate, stearyl (meth)acrylate, ethylcarbitol (meth)acrylate, tetrahydrofurfuryl (meth)acrylate, caprolactone modified tetrahydrofurfuryl (meth)acrylate, cyclohexyl (meth)acrylate, dicyclopentanyl (meth) acrylate, isobornyl (meth)acrylate, benzyl (meth)acrylate, phenyl (meth)acrylate, phenoxyethyl (meth)acrylate, phenoxydiethylene glycol (meth)acrylate, phenoxytetraethylene glycol (meth)acrylate, nonylphenoxyethyl (meth)acrylate, nonylphenoxytetraethylene glycol (meth)acrylate, methoxydiethylene glycol (meth)acrylate, ethoxydiethylene glycol (meth)acrylate, butoxyethyl (meth)acrylate, butoxytriethylene glycol (meth)acrylate, 2-ethylhexylpolyethylene glycol (meth)acrylate, nonylphenylpolypropylene glycol (meth) acrylate, methoxydipropylene glycol (meth)acrylate, glycidyl (meth)acrylate, 2-hydroxyethyl (meth)acrylate, 2-hydroxypropyl (meth)acrylate, glycerol (meth)acrylate, polyethylene glycol (meth)acrylate, polypropylene glycol (meth)acrylate, epichlorohydrin (hereinbelow, abbreviated as ECH) modified butyl (meth)acrylate, ECH modified phenoxy (meth)acrylate, ethylene oxide (hereinbelow, abbreviated as EO) modified phthalic acid (meth)acrylate, modified succinic acid (meth)acrylate, caprolactone modified 2-hydroxyethyl (meth)acrylate, N,N-dimethylaminoethyl (meth)acrylate, N,N-diethylaminoethyl (meth)acrylate, and (2-methyl-2-ethyl-1,3-dioxolan-4-yl)methyl (meth) acrylate, but not limited thereto.

Among them, the component (B) is preferably phenoxyethyl (meth)acrylate, 2-hydroxyethyl (meth)acrylate or (2-methyl-2-ethyl-1,3-dioxolan-4-yl)methyl (meth)acrylate, and more preferably phenoxyethyl acrylate, 2-hydroxyethyl methacrylate, or 2-methyl-2-ethyl-1,3-dioxolan-4-yl-methyl acrylate.

As for the component (B), a commercially available product may be used, and specific examples thereof include MEDOL-10 manufactured by Osaka Organic Chemical Industry, Ltd. and Light Acrylate (registered trademark) PO-A manufactured by Kyoeisha Chemical Co., Ltd.

The mass ratio between the component (A) and the component (B) is preferably in a range of 20:80 to 80:20. Accordingly, even higher storage stability and even higher low temperature curability can be exhibited. From the same point of view, the mass ratio between the component (A) and the component (B) is more preferably 70:30 to 30:70, even more preferably 60:40 to 40:60, and particularly preferably 50:50.

<<Component (C): Organic Peroxide Having Structure of General Formula 1>>

The component (C) which can be used in the present invention is an organic peroxide having a structure of the following general formula 1. In the formula, each $R^1$ independently indicates a hydrocarbon group, and it may be linear, branched, or cyclic.

The number of carbons in the hydrocarbon group of each $R^1$ is preferably 1 or higher and 30 or lower, more preferably 3 or higher and 20 or lower, and even more preferably 7 or higher and 12 or lower, although it is not particularly limited thereto.

Examples of the organic peroxide having a structure of the following general formula 1 include di-n-propyl-peroxydicarbonate, di-iso-propyl-peroxydicarbonate, di(4-tert-butylcyclohexyl)peroxydicarbonate (other name: bis(4-tert-butylcyclohexyl)peroxydicarbonate), di(2-ethylhexyl) peroxydicarbonate, and di-sec-butyl-peroxydicarbonate, but it is not limited thereto.

The component (C) is preferably an organic peroxide having a structure of the following general formula 2. In the general formula 2, each $R^2$ independently indicates a hydrocarbon group, and it may be linear, branched, or cyclic. The number of carbons in the hydrocarbon group of each $R^2$ is preferably 1 or higher and 6 or lower, more preferably 3 or higher and 5 or lower, and even more preferably 4.

The organic peroxide having a structure of the following general formula 2 is particularly preferably di(4-tert-butylcyclohexyl)peroxydicarbonate) although it is not particularly limited thereto.

[Chemical Formula 1]

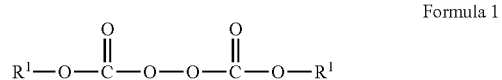

Formula 1

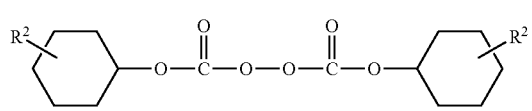

Formula 2

As for the component (C), a commercially available product may be used, and specific examples thereof include NPP-50M, IPP-50, IPP-27, TCP, OPP, and SBP as Peroyl series manufactured by NOF CORPORATION, but it is not limited thereto.

It is preferable that the component (C) is contained at 1 part by mass or more and 10 parts by mass or less relative to 100 parts by mass of the total of the component (A) and component (B). As the component (C) is 1 part by mass or more, even higher low temperature curability can be exhibited. As the component (C) is 10 parts by mass or less, the storage stability can be further enhanced. From the same point of view, the component (C) is preferably contained at 2 parts by mass or more and 7 parts by mass or less, and even more preferably at 3 parts by mass or more and 5 parts by mass or less relative to 100 parts by mass of the total of the component (A) and component (B).

<<Component (D): a Phosphoric Acid Ester Compound>>

The component (D) which can be used in the present invention is a phosphoric acid ester compound. Specifically, the phosphoric acid ester compound is a compound which has a structure represented by the following general formula 3. In the formula, $R^3$ represents an organic group, and n represents 1 or 2. Although specific reasons thereof remain unclear, the component (D) has an effect of enhancing the storage stability.

Examples of the component (D) include ethyl acid phosphate, butyl acid phosphate, butoxyethyl acid phosphate, oleyl acid phosphate, 2-ethylhexyl acid phosphate, 2-hydroxyethlmethacrylate acid phosphate, and dibutyl phosphate, but it is not limited thereto.

Furthermore, the component (D) is preferably a phosphoric acid ester compound which has a (meth)acrylic group in the molecule. It is more preferably a phosphoric acid ester compound which has a (meth)acyloyloxy group in the molecule. It is even more preferably a compound that is represented by the structure of the following general formula 4. In the formula, $R^4$ represents a hydrogen or a methyl group, $R^5$ represents a divalent hydrocarbon group, and n represents 1 or 2. Furthermore, in the present specification, when the phosphoric acid ester compound has a structure in which one (meth)acrylic group is contained in the molecule, it is taken as the component (D) instead of the component (B) which has been described above. The divalent hydrocarbon group as $R^5$ may be linear, branched, or cyclic. The number of carbons in the divalent hydrocarbon group as $R^5$ is preferably 1 or higher and 30 or lower, more preferably 1 or higher and 10 or lower, even more preferably 1 or higher and 5 or lower, and particularly preferably 1 or higher and 3 or lower, although it is not particularly limited thereto. By using as the component (D) a phosphoric acid ester compound which has a (meth)acrylic group or a (meth)acrylic group with substituent group in the molecule, in particular, a compound with a structure of the following general formula 4, it can be involved with radical polymerization during curing so that no volatilization is caused other than the cured product when the cured product is heated, and thus an occurrence of out gas can be reduced.

The phosphoric acid ester with a structure of the following general formula 4 is, although not particularly limited, particularly preferably 2-hydroxyethylmethacrylate acid phosphate.

[Chemical Formula 2]

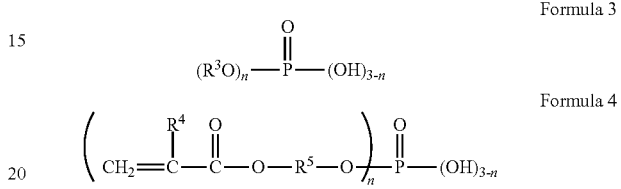

Formula 3

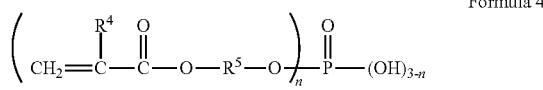

Formula 4

As for the component (D), a commercially available product may be used, and specific examples thereof include JP-502, JP-504, JP-508, JPA-514, JP-506H, JP-518-O, and DBP manufactured by Johoku chemical Co., Ltd., Light Ester (trademark) P-1M manufactured by Kyoeisha Chemical Co., Ltd., and MR-200 manufactured by Daihachi Chemical Industry Co., Ltd., but it is not limited thereto.

It is preferable that the component (D) is contained at 0.01 part by mass or more and 5.0 parts by mass or less relative to 100 parts by mass of the total of the component (A) and component (B). As the component (D) is 0.01 part by mass or more, the storage stability can be further enhanced. As the component (D) is 5 parts by mass or less, even higher low temperature curability can be exhibited. From the same point of view, the component (D) is preferably contained at 0.05 part by mass or more and 2 parts by mass or less, and even more preferably at 0.05 part by mass or more and 0.5 parts by mass or less relative to 100 parts by mass of the total of the component (A) and component (B).

<<Component (E): Electroconductive Particles that are Surface-Treated with Stearic Acid>>

The component (E) which can be used in the present invention is electroconductive particles that are surface-treated with stearic acid. Although specific reasons thereof remain unclear, the electroconductive particles treated with stearic acid have an effect of enhancing the storage stability, in particular. It is preferable that the electroconductive particles exhibit electric conductivity, and a material of the particles and a shape of the particles are not limited. Examples of the material of the electroconductive particles include silver powder, nickel powder, palladium powder, carbon powder, tungsten powder, and plated powder, and silver powder is particularly preferable. Furthermore, examples of the shape of the electroconductive particles include a globular shape, an amorphous shape, a flake shape (scale shape), a filament shape (needle shape), and a tree branch shape, and the flake shape is particularly preferable. Furthermore, it is possible that several kinds of the component (E) are used in combination. It is more preferable to mix several kinds of them, and it is even more preferable to mix two kinds of them.

Furthermore, from the viewpoint of having low cost of raw materials, electroconductive particles obtained by silver plating of insulating metal oxide, nickel powder, or powder of an insulating body can be also preferably used. Specific examples of the insulating metal oxide include copper powder, aluminum powder, and iron powder, and it is a metal having passivated object formed on a metal surface so as not to exhibit the electric conductivity.

For kneading in the resin components, it is preferable that each component (E) has 50% average particle diameter of 100 μm or less. Furthermore, from the viewpoint of the electric conductivity and storage stability, it is more preferably 0.1 μm or more and 100 μm or less, even more preferably 0.2 μm or more and 10 μm or less, and particularly preferably 1 μm or more and 5 μm or less.

Herein, 50% average particle diameter of each component (E) can be measured by using a laser particle size analyzer.

Furthermore, it is preferable that each component (E) has tap density of 2.5 g/cm$^3$ or more and 3.5 g/cm$^3$ or less. Herein, tap density of each component (E) can be measured by JIS Z 2512: 2012.

Furthermore, it is preferable that the component (E) has BET specific surface area of 0.1 cm$^2$/g or more and 3.0 cm$^2$/g or less. Herein, BET specific surface area of each component (E) can be measured by a BET method.

In the case of mixing two kinds for the component (E), it is preferable to combine particles with relatively large 50% average particle diameter with particles with relatively small 50% average particle diameter. In that case, mass ratio of the particles with relatively large 50% average particle diameter relative to the particles with relatively small 50% average particle diameter (mass of particles with relatively large 50% average particle diameter/mass of particles with relatively small 50% average particle diameter) is preferably 0.1 or more and 10 or less, more preferably 0.2 or more and 5 or less, and even more preferably 0.5 or more and 2 or less. Furthermore, in the case of mixing two kinds for the component (E), it is more preferable that the 50% average particle diameter of the particles with relatively large 50% average particle diameter is more than 3 μm and 5 μm or less and the 50% average particle diameter of the particles with relatively small 50% average particle diameter is more than 1 μm or more and 3 μm or less.

In the case of using electroconductive particles that are surface-treated with stearic acid as the component (E), considering the cost and electric conductivity, the particles are preferably silver powder or silver-plated powder which has been surface-treated with stearic acid, more preferably silver powder which has been surface-treated with stearic acid, and even more preferably silver powder with flake shape which has been surface-treated with stearic acid.

As a method for treating the surfaces of electroconductive particles, a method of treating stearic acid diluted with solvent together with electroconductive particles using a ball mill or the like and drying the solvent or the like is known, but the method is not limited to them.

As described above, it is essential that the component (E) (in the case of mixing several kinds, their total amount) is contained at 100 to 1000 parts by mass relative to 100 parts by mass of the total of the component (A) and component (B). That is because, if the component (E) is less than 100 parts by mass, the electric conductivity is not exhibited. On the other hand, if it is more than 1000 parts by mass, there is a problem in workability due to an occurrence of stringy or the like. From the same point of view, the component (E) (in the case of mixing several kinds, their total amount) is preferably contained at 100 parts by mass or more and 900 parts by mass or less and more preferably at 100 parts by mass or more and 800 parts by mass or less relative to 100 parts by mass of the total of the component (A) and component (B). Furthermore, from the viewpoint of having low cost of raw materials, the component (E) (in the case of mixing several kinds, their total amount) is preferably contained at 100 parts by mass or more and 500 parts by mass or less, and more preferably at 100 parts by mass or more and 200 parts by mass or less relative to 100 parts by mass of the total of the component (A) and component (B), in the case of using the ferromagnetic powder which will be described later.

<<Other Components>>

The thermocurable electroconductive adhesive according to one embodiment of the present invention may contain other components within a range in which the characteristics of the present invention are not impaired by them.

[Adhesion Aid Agent]

The thermocurable electroconductive adhesive according to one embodiment of the present invention may contain an adhesion aid agent within a range in which the characteristics of the present invention are not impaired by it. A phenoxy resin is preferred as an adhesion aid agent. Although the specific reasons remain unclear, the phenoxy resin has a high effect of enhancing the adhesiveness (adhesion strength), in particular.

As for the adhesion aid agent, any agent which is compatible with the component (A) or the component, (B) can be used. Herein, it is generally known that a gold and/or nickel adherend may sometimes have a lowered adhesion property due to the characteristics of metal. Furthermore, because ratio of the adhesive components in a total electroconductive adhesive is low in general, there is a tendency that the electroconductive adhesive has lower adhesion strength compared to adhesives other than the electroconductive adhesive. However, by adding an adhesion aid agent, in particular, a phenoxy resin, the adhesion property to gold and/or nickel can be further increased. Meanwhile, the electroconductive adhesive according to the present invention still has a good adhesion property to a gold and/or nickel adherend even in a system not added with any adhesion aid agent.

Preferred examples of the adhesion aid agent include a phenoxy resin, a silane coupling agent, and a thermoplastic polyurethane resin of aromatic type, but not limited thereto. Furthermore, as described above, more preferred examples as an adhesion aid agent are a phenoxy resin.

Examples of the phenoxy resin include a phenoxy resin of bisphenol A, AP, AF, B, BP, C, E, F, G, M, S, P, PH, TMC and Z type, but it is not limited to them. Among them, from the viewpoint of the adhesion strength, a phenoxy resin of bisphenol A type is more preferable.

As for the phenoxy resin, a commercially available product may be used, and specific examples thereof include 1256, 4250, 4275 as jER (registered trademark) series manufactured by Mitsubishi Chemical Corporation, and YP-50, YP-50S, and YP-70 manufactured by Shin-Nittetsu Sumitomo Chemical Co., Ltd., but it is not limited to them.

Preferred examples of the silane coupling agent include vinyltrimethoxysilane, but it is not limited to them.

As for the silane coupling agent, a commercially available product may be used, and specific examples thereof include KBM-1003 manufactured by Shin-Etsu Chemical Co., Ltd., but it is not limited to them.

As for the thermoplastic polyurethane resin of aromatic type, a commercially available product may be used, and specific examples thereof include Pandex (registered trademark) T-5201 manufactured by DIC Corporation, but it is not limited thereto.

It is preferable that the adhesion aid agent is contained at 0.1 to 30.0 parts by mass relative to 100 parts by mass of the total of the component (A) and component (B). As the adhesion aid agent is added at 0.1 part by mass or more, the adhesion property is further enhanced. As the adhesion aid agent is added at 30.0 parts by mass or less, viscosity of the adhesive can be further suppressed at low level so that an occurrence of stringy during application can be further reduced. From the same point of view, the adhesion aid agent is more preferably contained at 0.5 parts by mass or more and 10 parts by mass or lass, and even more preferably at 1 part by mass or more and 5 parts by mass or less relative to 100 parts by mass of the total of the component (A) and component (B).

[Ferromagnetic Powder]

It is preferable, that the thermocurable electroconductive adhesive according to one embodiment of the present invention is additionally added with powder having ferromagnetic property within a range in which the characteristics of the present invention are not impaired by it. Hereinbelow, powder having ferromagnetic property is referred to as a ferromagnetic powder. By adding the ferromagnetic powder, even when the addition amount of the electroconductive particles is reduced, the same electric conductivity as the electric conductivity before reducing the addition amount of electroconductive particles can be obtained. Accordingly, adding the ferromagnetic powder and reducing further the addition amount of the electroconductive particles make it a preferred embodiment from the viewpoint of reducing the cost of raw materials while maintaining favorable electric conductivity.

The powder having ferromagnetic property (ferromagnetic powder) is required to be a powder consisting of permanent magnet. Permanent magnet is a subject that can maintain the magnetic property for a relatively long period of time without being supplied of any magnetic field or current from the outside. Specific examples of the permanent magnet include an alnico-based magnet which has aluminum-nickel-cobalt as main constitutional component, a ferrite-based magnet which has iron and strontium or barium as main constitutional component, and a rare earth-based magnet which has neodium samarium-cobalt as main constitutional component. On the other hand, for example, soft iron having property as a magnet only when subjected to magnetization by external magnetic field is referred to as a temporary magnet.

Although there is a difference depending on measurement site, magnet shape, or the like, residual magnetic induction is used as a magnetism criterion in the present invention. The aforementioned alnico-based magnet and rare earth-based magnet have high residual magnetic induction (Br), i.e., 9.0 to 14.0 kG, while the ferrite-based magnet has low residual magnetic induction (Br), i.e., 1.0 to 5.0 kG. A magnet within such ranges (range of from 1.0 kG or more to 14.0 kG or less) is referred, to as a ferromagnetic magnet. In the present specification, powder of a ferromagnetic magnet is referred to as powder having ferromagnetic property (ferromagnetic powder).

The ferromagnetic powder is not particularly limited as long as it is a magnet powder having ferromagnetic property. However, considering the cost, anisotropic or isotropic ferrite-based magnet powder is preferable.

Furthermore, the average particle diameter of the ferromagnetic powder is preferably 5 μm or less from the viewpoint of being suitable for kneading with a resin.

A magnet can have a strong magnetic property only in a specific direction, and such magnet is referred to as an anisotropic magnet. The anisotropic magnet exhibits strong characteristics only in a specific direction and tends to have no magnetism in other directions. On the other hand, a magnet showing the same magnetism in any direction is referred to as an isotropic magnet, and it is characterized in that, although the magnetism is weaker than the strong magnetism in a specific direction exhibited by an anisotropic magnet, the magnetism is shown regardless of the direction in which the magnet is used. The isotropic or anisotropic magnet powder can be added and mixed with a resin like plastic and rubber, and molded and solidified into a predetermined shape by compression, extrusion, pressure extrusion, or the like. As a method for molding a resin molded article while orienting the anisotropic magnet powder in a resin molded article, a processing method including two kinds of orientation method, for example, mechanical orientation and magnetic field orientation, can be mentioned. According to the molding method including mechanical orientation, orientation is achieved based on mechanical shear between rolls, and thus magnet powder of which particle shape is a plate shape is used for having easy orientation. On the other hand, according to the molding including magnetic field orientation, pressure extrusion and molding is carried out in magnetic field by using an extrusion molding device, and magnet powder of which particle has a slightly round shape is used so as not to experience any resistance during flowing. Furthermore, the case of using powder consisting of isotropic magnet is different from the case of using powder consisting of anisotropic magnet, and molding is carried out while the particles of the magnet powder are in an at-random direction.

Among the ferromagnetic powders, it is preferred in the present invention to use the powder consisting of an anisotropic magnet. Specific examples of preferred ferromagnetic powder as powder of an anisotropic magnet include NF-350, which is ferrite-based magnet powder for anisotropic magnetic field orientation manufactured by DOWA Electronics Materials Co., Ltd., but it is not limited thereto.

As for the ferromagnetic powder, a commercially available product may be used, and specific examples thereof include, in addition to the aforementioned NF-350, which is ferrite-based magnet powder for anisotropic magnetic field orientation manufactured by DOWA Electronics Materials Co., Ltd., OP-56 for anisotropic mechanical orientation, isotropic BOP-K, and the like, but it is not limited thereto.

It is preferable that the ferromagnetic powder is added at 1 to 40 parts by mass relative to 100 parts by mass of the total of the component (A) and component (B). By adding the ferromagnetic powder, the same electric conductivity as the electric conductivity before reducing the addition amount of electroconductive particles can be obtained even when the addition amount of electroconductive particles is reduced. Accordingly, the cost of raw materials can be reduced while maintaining favorable electric conductivity. From the same point of view, the ferromagnetic powder is more preferably contained at 1 part, by mass or more and 30 parts by mass or less, and even more preferably at 1 part by mass or more and 20 parts by mass or less relative to 100 parts by mass of the total of the component (A) and component (B).

[Stabilizer]

It is preferable that the thermocurable electroconductive adhesive according to one embodiment of the present invention contains a stabilizer within a range in which the characteristics of the present invention are not impaired by it. Examples of the stabilizer include a polymerization inhibitor and a chelating agent. For maintaining the storage stability by capturing radical species that are generated, a polymerization inhibitor may be also used. Furthermore, for capturing metal ions that are generated, a chelating agent may be used.

Specific examples of the polymerization inhibitor include a quinone-based polymerization inhibitor such as hydroquinone, methoxyhydroquinone, benzoquinone, or p-tert-butylcatechol, an alkylphenol-based polymerization inhibitor such as 2,6-di-tert-butylphenol, 2,4-di-tert-butylphenol, 2-tert-butyl-4,6-dimethylphenol, 2,6-di-tert-butyl-4-methylphenol (BHT), or 2,4,6-tri-tert-butylphenol, an amine-based polymerization inhibitor such as alkylated diphenylamine, N,N'-diphenyl-p-phenylenediamine, phenothiazine, 4-hydroxy-2,2,6,6-tetramethylpiperidine, 4-benzoyloxy-2,2,6,6-tetramethylpiperidine, 1,4-dihydroxy-2,2,6,6-tetramethylpiperidine, or 1-hydroxy-4-benzoyloxy-2,2,6,6-tetramethylpiperidine, and an N-oxyl-based polymerization inhibitor such as 2,2,6,6-tetramethylpiperidine-N-oxyl, 4-hydroxy-2,2,6,6-tetramethylpiperidine-N-oxyl, or 4-benzoyloxy-2,2,6,6-tetramethylpiperidine-N-oxyl, but it is not limited thereto. Among them, the alkylphenol-based polymerization inhibitor is preferred as a polymerization inhibitor. More preferably, the polymerization inhibitor is 2,6-di-tert-butyl-4-methylphenol (BHT).

Examples of the chelating agent include tetrasodium ethylenediamine-N,N,N',N'-tetraacetate tetrahydrate and disodium ethylenediamine-N,N,N',N'-tetraacetate dihydrate, but it is not limited thereto. As the chelating agent, tetrasodium ethylenediamine-N,N,N',N'-tetraacetate tetrahydrate is preferable.

As for the chelating agent, a commercially available product may be used, and specific examples thereof include 2NA (EDTA.2Na) and 4NA (EDTA.4Na) manufactured by DOJINDO Laboratories, and MZ-8 manufactured by Chelest Corporation as a chelating agent which is in liquid phase at 25° C., but it is not limited to them.

It is preferable that a polymerization inhibitor and a chelating agent are used in combination as a stabilizer. When a polymerization inhibitor and a chelating agent are used in combination as a stabilizer, the ratio of the mass of the polymerization inhibitor relative to the mass of the chelating agent (mass of polymerization inhibitor/mass of chelating agent) is preferably 0.1 or more and 10 or less, more preferably 0.2 or more and 5 or less, and even snore preferably 0.5 or more and 2 or less.

As the addition amount of the stabilizer increases, the storage stability is improved more. However, if the addition amount is excessively high, there is a case in which the reactivity is compromised. Based on the above, it is preferable that the stabilizer (in the case of using several kinds of them in combination, their total amount) is 0.001 to 1.0% by mass relative to the total mass of the thermocurable electroconductive adhesive. From the same point of view, the stabilizer (in the case of using several kinds of them, in combination, their total amount) is contained more preferably at 0.01% by mass or more and 0.5% by mass or less, and even more preferably at 0.02% by mass or more and 0.1% by mass or less relative to the total mass of the thermocurable electroconductive adhesive.

[Filler]

The thermocurable electroconductive adhesive according to one embodiment of the present invention may contain a filler within a range in which the characteristics of the present invention are not impaired by it. The filler may be classified into an inorganic filler and an organic filler, but any one of them can be used or both of them can be used.

Examples of the inorganic filler include metal powder not exhibiting any electric conductivity (metal powder having passivated object formed on a powder surface as caused by oxidation), alumina powder, calcium carbonate powder, talc powder, silica powder, and fumed silica powder. Examples of the organic filler include acryl particles, rubber particles, and styrene particles, but not limited thereto. By adding a filler, viscosity or thixotropy can be controlled and also an increase in strength can be obtained.

Powder characteristics such as average particle diameter or shape are not particularly limited. However, considering easy dispersion in composition and nozzle clogging, the average particle diameter is preferably 0.001 to 50 µm.

Among the fillers, it is preferable to use an inorganic filler. It is more preferable to use fumed silica powder. By adding fumed silica powder, in particular, not only the thixotropy is provided but also the storage stability is maintained at the same time. As for the fumed silica powder, fumed silica powder which has been surface-treated with a silane compound is preferable. Fumed silica powder which has been surface-treated with dimethyldichlorosilane is particularly preferable.

As for the fumed silica powder, a commercially available product may be used, and specific examples thereof include AEROSIL (registered trademark) R805, R972 and the like that are manufactured by Nippon Aerosil Co., Ltd., but it is not limited to them.

It is preferable that the filler is added at 0.1 to 10 parts by mass relative to 100 parts by mass of the total of the component (A) and component (B). As the filler is more than 0.1 part by mass or more, the fluidity can be stabilized and also the workability can be further enhanced at the same time. As the filler is less than 10 parts by mass, the effect of maintaining the storage stability can be further enhanced. From the same point of view, the filler is more preferably contained at 0.2 parts by mass or more and 5 parts by mass or less, and even more preferably at 0.5 part by mass or more and 2 parts by mass or less relative to 100 parts by mass of the total of the component (A) and component (B).

[Additives Other than Those Described Above]

The thermocurable electroconductive adhesive according to one embodiment of the present invention may additionally contain a suitable amount of additives such as a colorant including a pigment and a dye, a flame retardant, an antioxidant, an anti-foaming agent, a coupling agent, a leveling agent, or a rheology control agent within a range in which the characteristics of the present invention axe not impaired by them. According to addition of them, an adhesive excellent in electric conductivity, resin strength, adhesive strength, workability, storage stability or the like, or a cured product of the adhesive is obtained.

<<Adherend>>

The adherend of the thermocurable electroconductive adhesive according to one embodiment of the present invention is not particularly limited. However, for having effective exhibition of the excellent adhesion strength and electric conductivity that are shown by the thermocurable electroconductive adhesive according to one embodiment of the present invention, the adherend is preferably a metallic adherend, more preferably a poorly-adhesive metal lie adherend, even more preferably a gold and/or nickel adherend, and particularly preferably a gold adherend.

For a gold and/or nickel adherend, the thermocurable electroconductive adhesive according to one embodiment of the present invention preferably has adhesion strength of 5 MPa or more, and more preferably 5 MPa or more and 25 MPa or less. As the adhesion strength is 5 MPa or more, sufficient adhesion strength is obtained. Furthermore, as the adhesion strength is 25 MPa or less, stable adhesion strength and electric conductivity can be obtained even for an electric and electronic component with small adhesion area. From the same point of view, the adhesion strength is more preferably 10 MPa or more and 25 MPa or less. Herein, it is particularly preferable that the thermocurable electroconductive adhesive according to one embodiment of the present invention has the adhesion strength within the above range for a gold adherend. Furthermore, values of adhesion strength are the values that are obtained by the evaluation method described in Examples which will be described later.

<Method for Adhesion>

Another aspect of the present invention is an adhesion method for adhering the thermocurable electroconductive adhesive on a gold and/or nickel adherend. Herein, as for the thermocurable electroconductive adhesive, any thermocurable electroconductive adhesive according to the present invention can be suitably used. Herein, preferred examples of the thermocurable electroconductive adhesive to be used and constitutional components thereof are the same as the thermocurable electroconductive adhesive according to the aforementioned one embodiment according to the present invention.

Herein, the adhesion method is preferably an adhesion method in which the thermocurable electroconductive adhesive is subjected to low temperature curing in an atmosphere of 80° C. or higher and 130° C. or lower. The curing temperature is more preferably 80° C. or higher and 110° C. or lower, even more preferably 80° C. or higher and 100° C. or lower, and particularly preferably 80° C. or higher and 90° C. or lower from the viewpoint of the low temperature effect. Herein, the curing time is not particularly limited, and known conditions can be suitably used. However, it is preferably 30 minutes or longer and 120 minutes or shorter, and more preferably 60 minutes or longer and 100 minutes or shorter. Furthermore, the adhesion method is preferably an adhesion method in which the thermocurable electroconductive adhesive is adhered to a gold and/or nickel adherend with adhesion strength of 5 MPa or more. Herein, a preferred example of the adherend and a preferred range of the adhesion strength are the same as the thermocurable electroconductive adhesive according to one embodiment of the present invention which is described in the above. Based on this, the adhesion method is more preferably an adhesion method in which the thermocurable electroconductive adhesive is subjected to low temperature curing in an atmosphere of 80° C. or higher and 130° C. or lower and adhered to a gold and/or nickel adherend with adhesion strength of 5 MPa or more. The adhesion method is even more preferably an adhesion method in which the thermocurable electroconductive adhesive is subjected to low temperature curing in an atmosphere of 80° C. or higher and 130° C. or lower for curing time of 30 minutes or longer and 120 minutes or shorter and adhered to a gold and/or nickel adherend with adhesion strength of 5 MPa or more.

EXAMPLES

Hereinbelow, the present invention is described in more detail with an aid of Examples, but the present invention is not limited those Examples only. Hereinbelow, the thermocurable electroconductive adhesive is also simply referred to as an adhesive.

In order to produce the adhesives of Examples 1 to 11 and Comparative Examples 1 to 9, the following components were prepared.

<<Component (A): Urethane Modified Oligomer Having (meth)acrylic Group>>
Urethane acrylate oligomer (UF-8001G, manufactured by Kyoeisha Chemical Co., Ltd.).

<<Component (B): Monomer Having One (meth)acrylic Group in the Molecule>>
2-Methyl-2-ethyl-1,3-dioxolan-4-yl)methylacrylate (MEDOL-10, manufactured by Osaka Organic Chemical Industry, Ltd.)
Phenoxyethylacrylate (Light Acrylate (registered trademark) PO-A, manufactured by Kyoeisha Chemical Co., Ltd.)
2-Hydroxyethylmethacrylate (HEMA, manufactured by Nippon Shokubai Co., Ltd.).

<<Component (B'): Monomer Other Than the Component (B)>>
Polyethylene glycol diacrylate (Light Acrylate (registered trademark) 9EG-A, manufactured by Kyoeisha Chemical Co., Ltd.)
1,6-Hexanediol diacrylate (Viscoat (trademark) #230, manufactured by Osaka Organic Chemical Industry, Ltd.)
Dipentaerythritol hexaacrylate (A-DPH, manufactured by Shin-Nakamura Chemical Co., Ltd.)

<<Component (C): Organic Peroxide Having Specific Structure>>
Bis(4-tert-butylcyclohexyl)peroxydicarbonate (solid at 25° C.) (Peroyl (registered trademark) TCP, manufactured by NOF CORPORATION).

<<Component (C'): Organic Peroxide Other Than the Component (C)>>
Tert-butylperoxy-2-ethylhexonate (liquid at 25° C.) (Perbutyl (registered trademark) O, manufactured by NOF CORPORATION)
Dilauroyl peroxide (solid at 25° C.) (Peroyl (registered trademark) L, manufactured by NOF CORPORATION).

<<Component (D): a Phosphoric Acid Ester Compounds>>
Ethyl acid phosphate (JP-502, manufactured by Johoku Chemical Co., Ltd.)
2-Hydroxyethylmethacrylate acid phosphate (JPA-514, manufactured by Johoku Chemical Co., Ltd.)
Butoxyethyl acid phosphate (JP-506H, manufactured by Johoku Chemical Co., Ltd.)
Oleyl acid phosphate (JP-518-O, manufactured by Johoku Chemical Co., Ltd.).

<<Component (E): Electroconductive Particles That are Surface-Treated With Stearic Acid>>
Silver powder 1: Stearic acid-treated silver powder with flake shape having following powder characteristics
Tap density: 3.17 g/cm$^3$
50% Average particle diameter: 50 μm
BET specific surface area: 0.67 m$^2$/g
Silver powder 2: Stearic acid-treated silver powder with flake shape having following powder characteristics
Tap density: 3.57 g/cm$^3$
50% Average particle diameter: 1.2 μm
BET specific surface area: 2.01 m$^2$/g.

<<Component (E'): Electroconductive Particles Other than the Component (E)>>
Silver powder 3: Oleic acid-treated silver powder with flake shape having following powder characteristics
Tap density: 3.60 g/cm$^3$
50% Average particle diameter: 1.4 μm
BET specific surface area: 2.13 m$^2$/g
Silver powder 4: Maleic acid-treated silver powder with flake shape having following powder characteristics
Tap density: 3.59 g/cm$^3$ 50% Average particle diameter: 1.3 μm
BET specific surface area: 2.23 m$^2$/g
Silver powder 5: Non-treated silver with amorphous shape having following powder characteristics
Tap density: 1.85 g/cm$^3$
BET specific surface area: 0.26 m$^2$/g.
<<Adhesion Aid Agent>>
Phenoxy resin of bisphenol A type (jER (registered trademark) 1256, manufactured by Mitsubishi Chemical Corporation
Vinyltrimethoxysilane (KBM-1003, manufactured by Shin-Nittetsu Sumitomo Chemical Co., Ltd.)
Thermoplastic polyurethane resin of aromatic type (Pandex (registered trademark) T-5201, manufactured by the Corporation).
<<Ferromagnetic Powder>>
Ferrite-based magnet powder for anisotropic magnetic field orientation (NF-350, manufactured by DOWA Electronics Materials Co., Ltd.).
<<Stabilizer>>
2,6-Di-tert-butyl-4-methylphenol (BHT) (chemical reagent)
Tetrasodium ethylenediamine-N,N,N',N'-tetraacetate tetrahydrate (solid at 25° C.) (4NA (EDTA.4Na), manufactured by DOJINDO Laboratories).
<<Filler>>
Fumed silica powder that is surface-treated with dimethyldichlorosilane (AEROSIL (registered trademark) R972, manufactured by Nippon Aerosil Co., Ltd.).

The component (A), the component (B) (or the component (B')), the component (D), an adhesion aid agent, and a stabilizer were weighed and added to a stirring bath followed by stirring for 1 hour. In a case in which the adhesion aid agent is in solid form, the stirring was performed for 2 hours in an atmosphere of 60° C. After confirming the atmosphere of 25° C., the component (E) (or the component (E')), the component (C) (or the component (C')), the filler, and the ferromagnetic powder were weighed and added to the stirring bath followed by stirring for 1 hour. Detailed preparation amount was based on Table 1 and Table 2. In Table 1 and Table 2, the numerical values of the addition amount of each component were all described in terms of parts by mass.

TABLE 1

| Component | Name of raw materials | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|---|
| Component (A) | UF-8001G | 50 | 50 | 50 | 50 | 50 | 50 | 50 | 50 | 50 | 50 |
| Component (B) | MEDOL-10 | 50 | | | 50 | 50 | 50 | 50 | 50 | 50 | 50 |
| | PO-A | | 50 | | | | | | | | |
| | HEMA | | | 50 | | | | | | | | |
| Component (B') | 9EG-A | | | | | | | | | | |
| | V#230 | | | | | | | | | | |
| | A-DPH | | | | | | | | | | |
| Component (C) | Peroyl TCP | 3.5 | 3.5 | 3.5 | 3.5 | 3.5 | 3.5 | 3.5 | | | 3.5 |
| Component (C') | Perbutyl O | | | | | | | | 3.5 | | |
| | Peroyl L | | | | | | | | | 3.5 | |
| Component (D) | JP-502 | 0.15 | 0.15 | 0.15 | | | | | 0.15 | 0.15 | 0.15 |
| | JPA-514 | | | | 0.15 | | | | | | |
| | JP-506H | | | | | 0.15 | | | | | |
| | JP-518-O | | | | | | 0.15 | | | | |
| Component (E) | Silver powder 1 | 70 | 70 | 70 | 70 | 70 | 70 | 280 | 70 | 70 | 70 |
| | Silver powder 2 | 120 | 120 | 120 | 120 | 120 | 120 | 480 | 120 | 120 | |
| Component (E') | Silver powder 3 | | | | | | | | | | 120 |
| | Silver powder 4 | | | | | | | | | | |
| | Silver powder 5 | | | | | | | | | | |
| Adhesion aid agent | jER1256 | | | | | | | | | | |
| | KBM-1003 | | | | | | | | | | |
| | T-5201 | | | | | | | | | | |
| Ferromagnetic powder | NF-350 | | | | | | | | | | |
| Stabilizer | BHT | 0.1 | 0.1 | 0.1 | 0.1 | 0.1. | 0.1 | 0.1 | 0.1 | 0.1 | 0.1. |
| | 4NA | 0.1 | 0.1 | 0.1 | 0.1 | 0.1. | 0.1 | 0.1 | 0.1 | 0.1 | 0.1. |
| Filler | R972 | 1.0 | 1.0 | 1.0 | 1.0 | 1.0 | 1.0 | 1.0 | 1.0 | 1.0 | 1.0 |
| | Total | 294.85 | 294.85 | 294.85 | 294.85 | 294.85 | 294.85 | 864.85 | 294.85 | 294.85 | 294.85 |
| | Addition amount of component (E) | 190 | 190 | 190 | 190 | 190 | 190 | 760 | 190 | 190 | 70 |

TABLE 2

| Component | Name of raw materials | Comparative Example 4 | Comparative Example 5 | Comparative Example 6 | Comparative Example 7 | Comparative Example 8 | Comparative Example 9 | Example 8 | Example 9 | Example 10 | Example 11 |
|---|---|---|---|---|---|---|---|---|---|---|---|
| Component (A) | UF-8001G | 50 | 50 | 50 | 50 | 50 | 50 | 50 | 50 | 50 | 50 |
| Component (B) | MEDOL-10 | 50 | 50 | 50 | | | | 50 | 50 | 50 | 50 |
| | PO-A | | | | | | | | | | |
| | HEMA | | | | | | | | | | |
| Component (B') | 9EG-A | | | | 50 | | | | | | |
| | V#230 | | | | | 50 | | | | | |
| | A-DPH | | | | | | 50 | | | | |

TABLE 2-continued

| Component | Name of raw materials | Comparative Example 4 | Comparative Example 5 | Comparative Example 6 | Comparative Example 7 | Comparative Example 8 | Comparative Example 9 | Example 8 | Example 9 | Example 10 | Example 11 |
|---|---|---|---|---|---|---|---|---|---|---|---|
| Component (C) | Peroyl TCP | 3.5 | 3.5 | 3.5 | 3.5 | 3.5 | 3.5 | 3.5 | 3.5 | 3.5 | 3.5 |
| Component (C') | Perbutyl O | | | | | | | | | | |
| | Peroyl L | | | | | | | | | | |
| Component (D) | JP-502 | 0.15 | 0.15 | | 0.15 | 0.15 | 0.15 | 0.15 | 0.15 | 0.15 | 0.15 |
| | JPA-514 | | | | | | | | | | |
| | JP-506H | | | | | | | | | | |
| | JP-518-O | | | | | | | | | | |
| Component (E) | Silver powder 1 | 70 | 70 | 70 | 70 | 70 | 70 | 70 | 70 | 70 | 70 |
| | Silver powder 2 | | | 120 | 120 | 120 | 120 | 120 | 120 | 120 | 40 |
| Component (E') | Silver powder 3 | | | | | | | | | | |
| | Silver powder 4 | 120 | | | | | | | | | |
| | Silver powder 5 | | 120 | | | | | | | | |
| Adhesion aid agent | jER1256 | | | | | | 1.5 | | | | |
| | KBM-1003 | | | | | | | 1.5 | | | |
| | T-5201 | | | | | | | | 1.5 | | |
| Ferromagnetic powder | NF-350 | | | | | | | | | | 20 |
| Stabilizer | BHT | 0.1 | 0.1 | 0.1 | 0.1 | 0.1. | 0.1 | 0.1 | 0.1 | 0.1 | 0.1. |
| | 4NA | 0.1 | 0.1 | 0.1 | 0.1 | 0.1. | 0.1 | 0.1 | 0.1 | 0.1 | 0.1. |
| Filler | R972 | 1.0 | 1.0 | 1.0 | 1.0 | 1.0 | 1.0 | 1.0 | 1.0 | 1.0 | 1.0 |
| Total | | 294.85 | 294.85 | 294.70 | 294.85 | 294.85 | 294.85 | 296.35 | 295.35 | 296.35 | 234.85 |
| Addition amount of component (E) | | 70 | 70 | 190 | 190 | 190 | 190 | 190 | 190 | 190 | 110 |

Storage stability determination, low temperature curability determination, adhesion strength measurement, and electric conductivity measurement were performed for Examples 1 to 11 and Comparative Examples 1 to 9. The results are summarized in Table 3 and Table 4.

[Storage Stability Determination]

2 mL of the prepared adhesive was used, and the viscosity under the following measurement conditions was measured and used as initial viscosity. After that, the adhesive was allowed to stand in an atmosphere of 25° C., the measurement was carried out every 12 hours, and the viscosity measurement was carried out till to have 20% increase compared to the initial viscosity. Then, "storage stability" was determined based on the following evaluation criteria. Because the application amount was not varied during the application of adhesive, the storage stability is preferably "◯".

(Measurement Conditions)

Cone rotor: 3°×R2.4

Shear speed: 1.0 (1/s)

Measurement temperature; 25° C. (temperature controlling device was used)

(Evaluation Criteria)

◯: It is longer than 24 hours

×: it is 24 hours or shorter.

[Low Temperature Curability Determination]

The adhesive was weighed in an amount of 100 mg on a glass plate, and after adding to a hot air drying furnace which has been set at 90° C., it was allowed to stand for 90 minutes. After taking out, when the temperature returns to 25° C., the cured product was pressed with a tip of a rod made of polytetrafluoroethylene. The curing state was then examined based on the following evaluation criteria, and determined as "low temperature curability". To reduce a damage of an adherend caused by heat, the low temperature curability is preferably "◯".

(Evaluation Criteria)

◯: Non-cured adhesive does not adhere onto the rod

×: Non-cured adhesive adheres onto the rod.

[Adhesion Strength Measurement]

On a nickel plate with thickness of 1.6 mm×width of 25 mm×length of 100 mm, a masking tape was applied to have thickness of 50 µm. By squeezing the adhesive, a uniform coating film was formed. On the coating film, a gold-plated chip (2φ×1 mm) was vertically dropped 1 cm above the coating film so as to prepare a test piece (n=5). Within 5 minutes, the test piece was added to a hot air drying furnace with an atmosphere of 90° C. After allowing it to stand for 90 minutes, the test piece was taken out from the hot air drying furnace. After the temperature returns to 25° C., a digital force gauge provided with contact unit was moved at 50 mm/minute while the nickel chip remains fixed, and by pressing the gold-plated chip with the contact unit, the "maximum strength (N)" was measured. According to conversion based on the contact area, the "adhesion strength (MPa)" was calculated, and the determination of adhesion strength was performed by using the following evaluation criteria. In order for an adherend not to depart, the adhesion strength is preferably "◯" or "⊙".

(Evaluation Criteria)

⊙: 10 MPa or snore and 25 MPa or less

◯: 5 MPa or more and less than 10 MPa

×: less than 5 MPa.

[Electric Conductivity Measurement]

On a glass plate with thickness of 2.0 mm×width of 50 mm×length of 100 mm, a masking tape was applied (thickness of 50 µm) to have length of 70 mm×width of 10 mm. By squeezing the adhesive, a uniform coating film was formed so as to prepare a test piece. The test piece was added to a hot air drying furnace with an atmosphere of 90° C. After allowing it to stand for 90 minutes, the test piece was taken out from the hot air drying furnace. After the temperature returns to 25° C., by using a dual display multimeter attached with plate-like electrodes, the "resistance value (Ω)" was measured in a state in which the distance between electrodes is 50 mm. From the resistance value, distance between electrodes, and thickness of the adhesive after curing, the "electric conductivity (Ω·m)" was calculated, and the electric conductivity determination was carried oat by using the following evaluation criteria. From the viewpoint of ensuring the electric conductivity, the electric conductivity is preferably "○".

(Evaluation Criteria)
○: $9 \times 10^{-4}$ Ω·m or less
×: more than $9 \times 10^{-4}$ Ω·m.

sion strength was confirmed from Example 8 in which a phenoxy resin was added as an adhesion aid agent.

It was also shown that, when a ferromagnetic powder is added like Example 11, the electric conductivity can be maintained while the silver powder is reduced. Based on this it was confirmed that, by using a ferromagnetic powder, the cost of raw materials can be reduced while maintaining favorable electric conductivity.

TABLE 3

| Test item | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|
| Storage stability | ○ | ○ | ○ | ○ | ○ | ○ | ○ | ○ | ○ | X |
| Low temperature curability | ○ | ○ | ○ | ○ | ○ | ○ | ○ | X | X | ○ |
| Adhesion strength | ○ | ○ | ○ | ○ | ○ | ○ | ○ | ○ | ○ | ○ |
| Electric conductivity | ○ | ○ | ○ | ○ | ○ | ○ | ○ | ○ | ○ | ○ |

TABLE 4

| Test item | Comparative Example 4 | Comparative Example 5 | Comparative Example 6 | Comparative Example 7 | Comparative Example 8 | Comparative Example 9 | Example 8 | Example 9 | Example 10 | Example 11 |
|---|---|---|---|---|---|---|---|---|---|---|
| Storage stability | X | X | X | ○ | ○ | X | ○ | ○ | ○ | ○ |
| Low temperature curability | ○ | ○ | ○ | ○ | ○ | ○ | ○ | ○ | ○ | ○ |
| Adhesion strength | ○ | ○ | ○ | ○ | ○ | ○ | ⊙ | ○ | ○ | ○ |
| Electric conductivity | ○ | ○ | ○ | X | X | X | ○ | ○ | ○ | ○ |

According to the comparison between Examples 1 to 7 and Comparative Example 1 and Comparative Example 2, Examples and Comparative Examples are different from each other in terms of the component (C), and therefore the low temperature curability is not exhibited in Comparative Example 1 and Comparative Example 2. Furthermore, according to the comparison between Examples 1 to 7 and Comparative Examples 3 to 6, the storage stability is impaired in the case of not adding the component (D) like Comparative Example 6 or in the case of a non-stearic acid treatment like Comparative Examples 3 to 5. Furthermore, according to the comparison between Examples 1 to 7 and Comparative Examples 10 to 12, it was found that the electric conductivity is lowered if a monomer having two or more (meth)acrylic groups in the molecule is used.

According to the comparison of Examples 1 and 4 to 6, they all have favorable characteristics even though they are different in terms of the component (D). Among them, Example 4 using, as the component (D), a phosphoric acid ester compound having a (meth)acrylic group in the molecule is expected to have a use as a thermocurable electroconductive adhesive that can reduce an occurrence of out gas when a cured product is heated.

According to the comparison of Examples 1 to 10, in particular. Examples 8 to 10, further enhancement of adhe-

INDUSTRIAL APPLICABILITY

The thermocurable electroconductive adhesive according to one embodiment of the present invention has favorable storage stability in an atmosphere of 25° C. and also favorable low temperature curability in an atmosphere of 80 to 130° C. Accordingly, the thermocurable electroconductive adhesive according to one embodiment of the present invention can reduce heat-caused damage on an adherend while causing no variation in application amount during application operation for a long period of time. Furthermore, the thermocurable electroconductive adhesive can maintain high adhesion strength to a poorly-adhesive metallic adherend such as gold or nickel and at the same time allows exhibition of the electric conductivity. Based on those characteristics, the thermocurable electroconductive adhesive can be used for assembly of various kinds of electronic components, and thus it has a possibility of being developed for a wide range of uses.

This application is based on Japanese Patent Application No. 2015-040513, filed in Japan on Mar. 2, 2015, the disclosure content of which is hereby incorporated as its entirety by reference.

The invention claimed is:
1. An isotropic thermocurable electroconductive adhesive comprising component (A) to component (E) such that the component (E) is contained at 100 parts by mass or more and 1000 parts by mass or less relative to 100 parts by mass of the total of the component (A) and component (B);

component (A): a urethane modified oligomer having a (meth)acrylic group component (B): a monomer having one (meth)acrylic group in the molecule component (C): an organic peroxide having the following structure

[Chemical Formula 1]

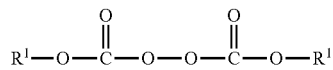

wherein in the formula, $R^1$ each independently represents a hydrocarbon group component (D): a phosphoric acid ester compound component (E): electroconductive particles that are surface-treated with stearic acid.

2. The isotropic thermocurable electroconductive adhesive according to claim 1, wherein the component (C) is an organic peroxide having the following structure:

[Chemical Formula 2]

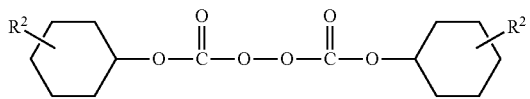

in the formula, $R^2$ each independently represents a hydrocarbon group.

3. The isotropic thermocurable electroconductive adhesive according to claim 1, wherein the component (E) is silver powder or silver-plated powder that is surface-treated with stearic acid.

4. The isotropic thermocurable electroconductive adhesive according to claim 1, wherein the component (D) contains a phosphoric acid ester compound which has a (meth)acrylic group in the molecule.

5. The isotropic thermocurable electroconductive adhesive according to claim 1, further comprising a phenoxy resin.

6. The isotropic thermocurable electroconductive adhesive according to claim 1, further comprising a ferromagnetic powder.

7. The isotropic thermocurable electroconductive adhesive according to claim 1, wherein the adhesive is used for adhesion to a gold and/or nickel adherend.

8. The isotropic thermocurable electroconductive adhesive according to claim 7, wherein adhesion strength to a gold and/or nickel adherend is 5 MPa or higher.

9. The isotropic thermocurable electroconductive adhesive according to claim 1, wherein the component (E) is contained at 100 parts by mass or more and 800 parts by mass or less relative to 100 parts by mass of the total of the component (A) and component (B).

* * * * *